Dec. 12, 1967     C. R. BARDES ET AL     3,357,247
LIQUID PHASE DETECTORS OR CONDENSATE INDICATORS
Filed June 28, 1965     2 Sheets-Sheet 1
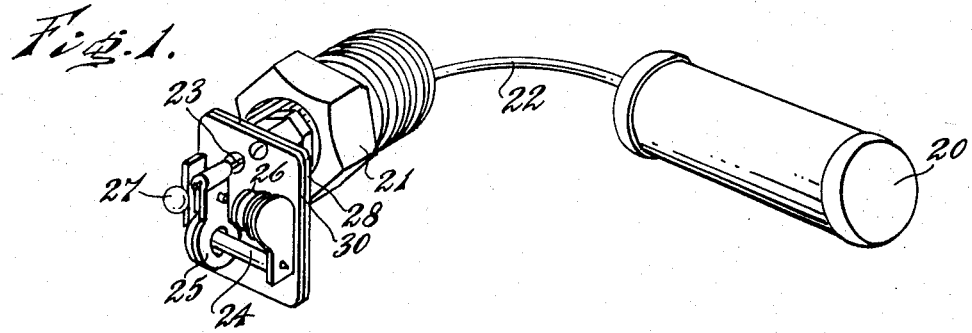
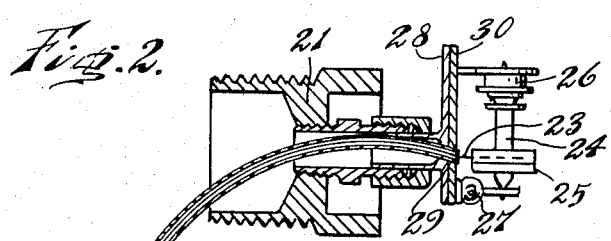
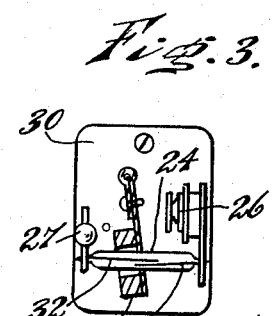
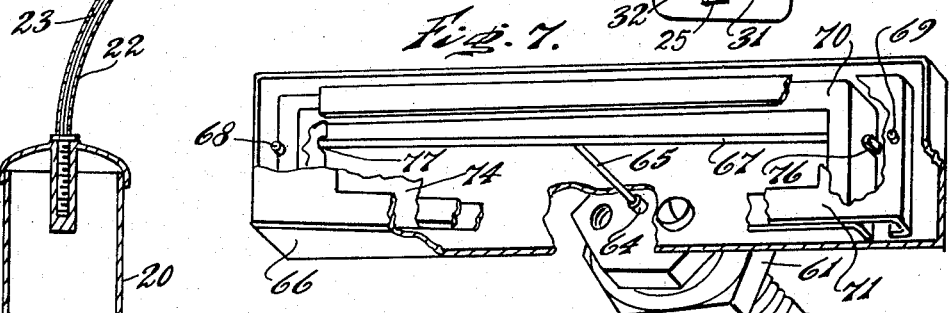
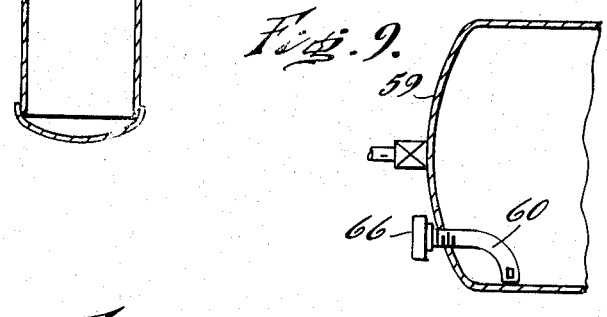
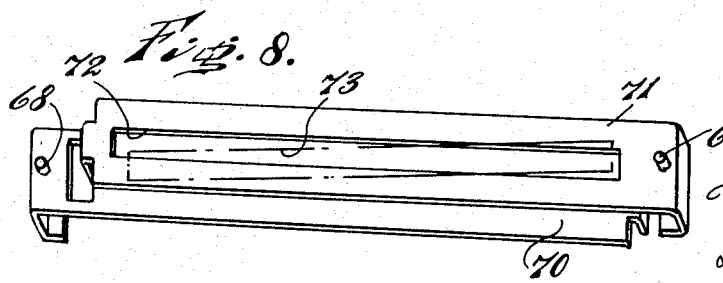
INVENTORS
Charles Robert Bardes
James W. Williams
BY
ATTORNEYS

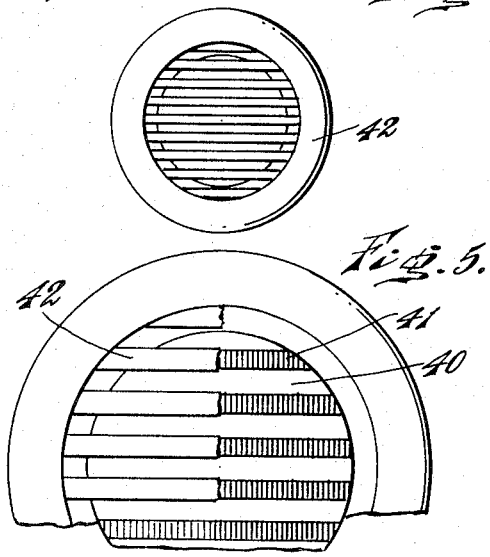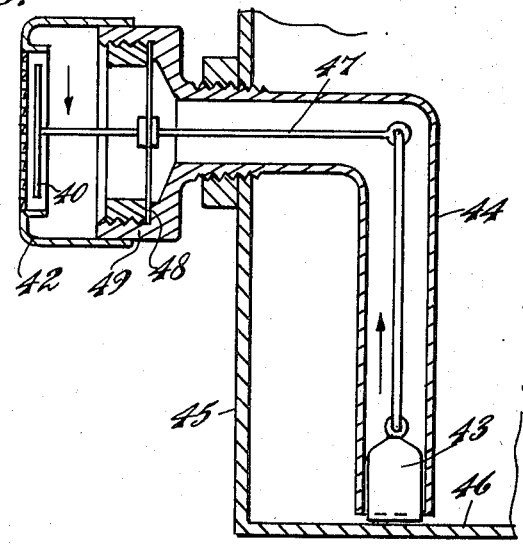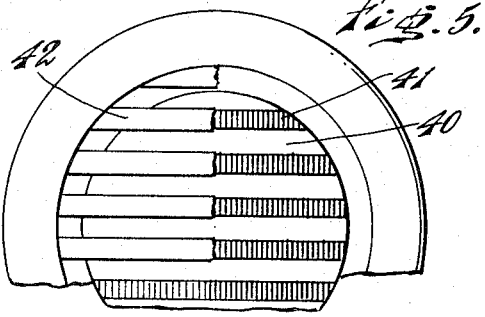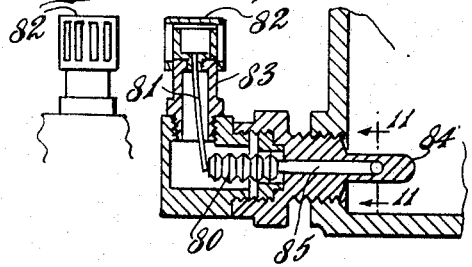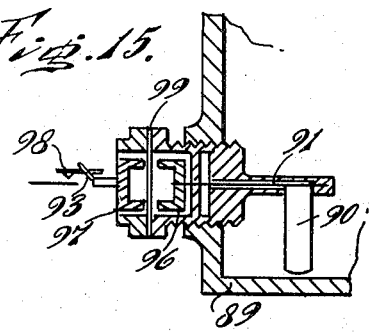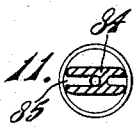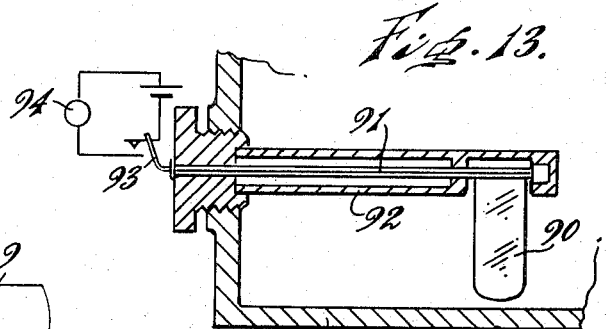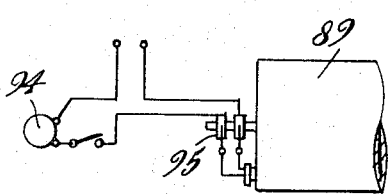

United States Patent Office 3,357,247
Patented Dec. 12, 1967

3,357,247
LIQUID PHASE DETECTORS OR CONDENSATE INDICATORS
Charles Robert Bardes, Lafayette Hills, and James W. Williams III, Lansdale, Pa., assignors to Yarway Corporation, Philadelphia, Pa., a corporation of Pennsylvania
Filed June 28, 1965, Ser. No. 467,208
7 Claims. (Cl. 73—306)

ABSTRACT OF THE DISCLOSURE

The present invention relates to an indicator for the presence of liquid such as condensate in a rotating drum which is turning at a rapid enough rate to distribute the liquid by centrifugal force over the radially outer portion of the drum interior. A sensing element is mounted on and turns with the drum located in the outer portion of the interior of the drum and transmits indication to an indicator located outside the drum.

Description of invention

This invention relates to a liquid phase detector and more particularly to a device for sensing the presence of condensate or other liquid within a rotating process roll or drum.

An object of this invention is to provide a device which will give a visible indication on the outside of a process roll of the presence or lack of presence of condensate fluid within the roll.

An additional object of this invention is to provide a mechanism which can be readily mounted on presently installed equipment.

A further purpose of this invention is to provide a device which is relatively compact and capable of being mounted on the side of a process roll offering no harmful projections to an operator of the equipment.

A further purpose is to provide a device which is of such a size that it will not adversely affect the static balance of the rotating roll.

A further purpose is to provide a device which utilizes no sliding or rotating seals and requires no periodic adjustment or maintenance.

A further purpose of this invention is to provide an entirely self-contained mechanism requiring no external source of energy.

A further purpose is to provide a device in which the indication of the presence of liquid condensate is independent both of the direction of rotation and the speed of rotation of the roll, whether it be variable or constant.

A further purpose of this invention is to provide a device which is of rugged construction, protected against overload and usable under high pressures and temperatures and yet low in production cost and inexpensive to install.

Process rolls are often thermally controlled by heating or cooling media introduced into the rolls. Such rolls are often used, for example, in paper making equipment wherein it is imperative that the temperature of the roll be constantly controlled, as a decrease in roll temperature results in incompletely dried paper. One convenient method is to introduce a vapor into the process roll such as steam maintained at a pressure corresponding to the desired saturation temperature. As the steam condenses the condensate must be removed and this is accomplished by means of a tube extending through a bearing at one end of the roll into the same with a downward projection so as to bring the open end of the tube adjacent the inner surface of the roll. A steam or vapor trap located on the outside of the roll and in communication with the tube serves to draw off the accumulated condensate while containing the steam in the roll.

Due to air binding, vapor locking and other causes, the vapor trap will not always function properly and thus normal drainage of the roll may be interrupted with the result that accumulated condensate within the roll will remain undetected. This situation has prompted the need for a liquid phase detector which will give a warning indicating drainage failure, as the presence of condensate in the roll adversely affects the proper temperature control and overall efficiency of the machine.

Although steam heating is the most common application, the advance in modern technology may provide an increasing variety of fluid heating media and liquids other than water vapor which may need to be controlled as they accumulate on the inside of the roll. It is possible also that for sub-normal temperature processing, evaporation of a refrigeration liquid might be employed and in this case the continued presence of refrigerating liquid may need to be insured inside of the roll subject to vapor release at a controlled rate. This need for positive insurance of the maintenance of the proper temperature of the rolls prompted the development of these liquid phase detectors as applied to process rolls.

Accordingly, the objects and purposes of this invention are accomplished by providing a device which can be mounted through one end of a process roll near its outer rim surface. This device consists basically of a sensing element positioned adjacent the inner surface of the roll which will respond to the presence of condensate at a particular position or level within the roll, an indicator means positioned outside of the roll revealing to an observer or operator on actuation the presence of condensate within the roll, along with motion transmitting means for transmitting the finding of the sensing element to the indicator.

The sensing element should be capable of differentiating between the vapor and the liquid phase present in the roll, the liquid being spread over the inside surface of the roll by the centrifugal forces of rotation.

Other objects and features of this invention will be apparent from the following description of the drawings wherein like numbers designate like parts.

FIGURE 1 is a perspective view of a condensate detector showing the use of a float sensing element to activate an indicator.

FIGURE 2 is a top sectional view of the device of FIGURE 1.

FIGURE 3 is an end view of the indicator mechanism of the device shown in FIGURES 1 and 2.

FIGURE 4 is a vertical elevation of an indicating mechanism of the shutter type also useful in this invention.

FIGURE 5 is an enlarged fragmentary view of the indicator of FIGURE 4.

FIGURE 6 is a vertical sectional view showing a device useful in this invention wherein a float means operates through mechanical linkage to indicate the presence of condensate within a process roll.

FIGURE 7 is a perspective view, partially broken away, of an indicating device using a detector vane within a protective tube as a sensing element.

FIGURE 8 is a perspective view showing the indicating shutters of the device of FIGURE 7, the shutters being shown in an activated position thereby indicating the presence of a liquid phase.

FIGURE 9 is a partial section of the wall of a pressure drum, showing the location of a liquid phase detector according to this invention.

FIGURE 10 shows another sensing mechanism utilizing the presence of the fluid pressure of the condensate within the roll.

FIGURE 11 is a sectional view taken along the lines 11—11 of FIGURE 10.

FIGURE 12 is a vertical elevation of a drum type indicator similar to the indicator of FIGURE 4.

FIGURE 13 shows an additional sensing mechanism useful in this invention embodying a vane type sensing element and an electrical indicator.

FIGURE 14 shows the form of an indicator which can be connected at a point remote from the process roll.

FIGURE 15 shows an additional form of a device using a magnetic means to transmit the response of the vane to an outside indicator.

One mechanism useful in carrying out the objects of this invention comprises a curved tube mounted through one end of a process roll so that its inner end terminates adjacent the inner surface of the roll, with an indicator mounted on the outside of the roll in cooperation with the outer end of the tube. A torsion wire is positioned within the curved tube and has a detector or sensing element attached to one end adjacent the inner end of the curved tube. A torque arm is attached to its opposite end which is placed within the indicator. Such a mechanism can be compactly constructed and conveniently mounted in an existing drum without creating any imbalance in the equipment and examples of the use of such a device are amply described in the following description of the drawings.

In FIGURE 1 there is shown a sensing element 20 which may suitably be a small float or any kind of displacement element. This element would be inserted through and sealed to one end of a process roll in a manner similar to that shown in FIGURE 9. A pipe plug 21 would be threaded into this hole in the end of the drum. In this particular embodiment the motion transmitting means between the sensing element 20 and the indicator may suitably consist of a wire-in-tube torsional responsive device 22. However, the scope of this invention is not to be restricted to this particular motion transmitting means but is intended to include all manners and means for transmitting the movement of a sensing element.

These particular torsional responsive or snap-acting wire-in-tube devices, are more fully described in U.S. Patent No. 3,067,623 entitled Transmission of Motion from Closed Space and in patent application Ser. No. 203,352, filed June 18, 1962, entitled Controlled Torque and Motion Device Through a Wall, now U.S. Patent No. 3,183,727, granted May 18, 1965 representing an improvement of the transmission device.

Essentially this device consists of a flexible hollow tube having within it a wire with a preformed curvature thereto. The tube may also be curved but preferably consists of a tube maintaining a straight position when relaxed. The inner wire, when free from the tube, has a prestressed curvature along that portion which is to extend into the tube. When the wire is placed inside a tube, the outer tube assumes a conforming curvature but of a radius greater than the radius of the curvature of the wire alone, the tube and wire each being deflected from the relaxed position by reason of the residual force of each. In FIGURE 2 the curved core wire 23 is shown within the tube 22 which now has assumed a curvature due to the preformed curvature of the core wire.

When the tube is deflected from its relaxed position due to the presence of liquid within the drum acting on the displacer, the outer tube is thus forced to assume a different curvature. This creates a force on the pre-stressed curved inner wire causing it to turn within the tube to assume a position which offers the least resistance. For example, if the wire and tube device was in the position as shown in FIGURE 2 and it was then deflected, the new position of the outer tube would now have changed the curvature of the pre-stressed inner core wire. The core wire in seeking to gain its original curvature by virtue of its internal stress would turn around within the tube until its residual curvature was more nearly in the same plane as the new curvature of the tube. This residual force in turning is transmitted as torque to the outer free end of the wire and to anything attached thereto, causing it to travel in angular motion. The torque is applied very rapidly which causes any object attached thereto to "snap" from one angular position to another.

Attached to the free end of the core wire 23 in FIGURE 1 is a suitable indicating device which will afford some visual or sound indication upon mere angular motion of one of its elements. Such an indicator is depicted in FIGURE 1 wherein a magnetic reed switch 24 is surrounded by a ring magnet 25, which is affixed to the exposed end of the core wire 23. A mercury battery 26 of approximately 1.4 volts, or other contained source of electrical energy, may be used, which upon activation of the switch will illuminate a small lamp 27. The outer tube 22 is affixed to the sleeve 28 at 29 (FIGURE 2), which can be conveniently threaded into the pipe plug in the side of the drum. Extending beyond the edge of the sleeve is core wire 23 which is attached to the ring magnet 25. The individual parts of the switch described above are mounted on a phenolic switch plate 30 which is mounted on the sleeve 28. As the displacement float 20 is moved in response to liquid in the drum, the change in curvature of the outer tube will cause the core wire to revolve, thus imparting angular motion to the ring magnet 25. This in turn creates a contact between the two reeds 31 and 32, completing the circuit between the battery and the lamp, the illumination of the lamp indicating to the operator that the steam trap is not performing properly and that corrective measures should be taken immediately. A small buzzer may equally be used as the indicator in place of the lamp. In addition, the torsion arm may be connected to a movable shutter which will change position in response to a change in position of the torque arm within the indicator, thus giving visual indication to the operator. A suitable example of such an indicating means is depicted in FIGURES 4 and 5. This indicating means is essentially a device which moves vividly colored bands or strips into view from a shielded position. The signal is clearly observable from its flat outline path regardless of the speed of the roll. As shown in FIGURE 5, a disc 40 having bands 41 thereon of a bright color such as chartreuse or fuchsia is positioned behind a slatted face plate 42. Movement of the color bands from behind the shields by movement of the sensing element indicates the presence of condensate.

In FIGURE 6 there is shown a device utilizing this type of indicator having a sensing float 43 which is disposed within a curved tube 44 threaded into the side of the rotating drum 45 rotated by means not shown. The float is positioned adjacent the inner surface 46 of the rotating drum and rises in response to the presence of condensate. As the float rises it pushes up on linkage bar 47 mounted through plate 48 in suitable pipe plug 49. The bar 47 pivots about this point in the plate, causing the opposite end where plate 40 is attached to move downwardly, thus exposing the colored portions 41 between the slits. The presence of liquid will thus be apparent to the operator. Due to the centrifugal force in the rotating drum the level of liquid will be equal around the entire perimeter of the inner surface of the drum and thus float 43 will continually operate the indicator during any sector of revolution.

In the other figures, several different embodiments are depicted which may equally be used to accomplish the objects of this invention. While they do not form a part of the present invention, they do show other types of mechanisms capable of detecting the presence of liquid phase in thermally controlled processing rolls. These embodiments operate on the differential velocity that exists between the roll and the condensate which may have accumulated within it. In operation, as the roll is rotating, a layer of condensate is spread over the inside surface by the centrifugal forces of rotation, the fluid building up in speed until it rotates at the same speed as the roll. However, as the liquid depth increases as measured from the inner surface of the roll, the velocity will tend to fall below the velocity of the roll as the centrifugal forces are not sufficient ot keep it at the same speed. Thus a differential in the speed of rotation of the indicator which is attached to the roll and the liquid layer at the point of response will be created.

While the mechanical float means as described in FIGURE 6 functions regardless of the relative velocity between the roll and the condensate; vanes may be positioned adjacent the inner edge of the rotating roll to sense the differential velocity, thus giving rise to an alternative means for indicating the presence of condensate. However, if the differential velocity approaches zero there would be no response from these vanes because the liquid condensate is now rotating at the same speed as the drum. Nevertheless, they are capable of functioning when (1) the roll is not revolving fast enough to bring the velocity of the liquid up to the rim speed by centrifugal action or (2) after the rim speed has been achieved, the subsequent build-up of liquid becomes too much for the centrifugal action to maintain it and thus a differential also begins to arise. In practice, however, especially as applied to paper making, the rolls are readily accelerated and de-accelerated with a resulting continuous differential movement between the fluid and the rolls. While condensate will produce a differential velocity reaction on such a vane, steam will have no effect as it is too slight.

If the vanes were attached to the end of a tube of a wire-in-tube transmission element as above described, when the differential velocity causes a drag on the vane or changes its position, the subsequent torsional response of the core wire could be used to indicate the presence of condensate. Similar to the above described indicators, the core wire can conveniently be attached to a torque arm which in turn will move a colored shutter within an indicator. In FIGURE 7 there is shown such a device including a cylindrical protector tube 60 integrally attached to a pipe plug 61 and curving inwardly so that its open end will be adjacent the inner end of a drum 59 as shown in FIGURE 9. Within the tube 60 is a vane 62 attached to a torsional responsive tube 63 which is secured to the pipe plug at 64. Within this tube of a wire-in-tube motion transmitting means is a core wire 65, extending out beyond the edge of the tube on the outside of the roll through the covering 66 of an indicator mechanism.

When the detector vane is centered in the protective tube in the normal position, the torque arm 67 is then parallel to the center line of shutter pivots 68 and 69 of inner and outer shutters 70 and 71 respectively. The slot 72 in the outer shutter is in alignment with the slot 73 of the inner shutter and the indicator window 74 in the cover, thus showing the black background of the back of the case. The torque arm 67 rides in a drive slot 76 of inner shutter 70 at one end and in drive slot 77 of outer shutter 71 at the other end.

The vane will be driven against the wall of protective tube 60 when either a puddle of condensate has formed in the vessel, the vane dragging through it on rotation of the drum at relatively slow speeds, or when the condensate has reached a quantity which the centrifugal force of the drum will be unable to sustain at rim speeds. This variation between the speed of the vane at rim speed and the slower speed of the liquid will create a force on the vane. Displacement of vane 62 causes a twist of tube 63 and corresponding rotation of core wire 65 carrying torque arm 67. Arm 67 engages the drive slot 76 and 77 in inner and outer shutters 70 and 71 rotating them about shutter pivots 68 and 69 to positions shown in detail in FIGURE 8 on clockwise rotation of the core wire 65. Opposite rotation of the wire will cause the shutters to assume opposite angular positions with respect to the center line of the shutter pivots. At this time opposite edges of the open slots and the shutters come into alignment on a diagonal of the indicator window 74. The shutters may be conveniently colored a fluorescent red in contrast to the black of the case in color. This provides a red band in the indicator window 74 which the construction of the device locates on a cord of the rotating drum circumference, thus making it visible while rotating to indicate the presence of condensate within the drum.

In FIGURE 10 there is shown another mechanism useful in carrying out the objects of the invention but not forming a part thereof, where the fluid pressure of the condensate within the drum is utilized to indicate the presence of excessive liquid accumulation. The fluid pressure operates on bellows 80 which causes lateral deflection of a wire-in-tube transmission device 81 which in turn causes torsional response of a drum indicator 82, having slots therein with appropriate colored strips on the cylinder 83 behind the slots. The fluid pressure acting on the open end of the tube 84, communicates with the inside of the bellows through passageway 85.

In FIGURE 13, a simple mechanism is depicted wherein a paddle 90 sensing the presence of liquid within the drum 89, is used to actuate an electrical circuit to give an indication of the presence of condensate. The paddle 90 is suspended from the end of the tube 91 of a torsional responsive device which is supported in tubular member 92 extending into the inside of the drum. Upon the deflection of the torsion tube, in a plane perpendicular to the plane of the paper, the electrical circuit is closed by torsion arm 93, thereby actuating a lamp or buzzer 94, thus indicating the presence of condensate within the drum. Power to the circuit may be supplied by a contained battery or by an outside source providing suitable contact rings and brushes 95 to convey the needed current such as shown in FIGURE 14. This arrangement would permit remote location of the signal as in an instrument panel in a control room.

FIGURE 15 shows a magnetic means of transmitting the response of a vane similar to FIGURE 13 through the pressure wall of a process roll 89. The torsional response of magnet 96 by the vane will cause magnet 97 on the other side of a non-magnetic sealing wall 99 to also turn, thus creating rotation of the torsion arm 93 outside of the drum, closing the switch 98 into an appropriate circuit initiating any type of desired alarm system.

Although only a few examples of the various combinations are shown for illustration, it will be obvious that the sensing of the liquid phase and the transmission of the response can be accomplished by the use of diaphragms, bellows, torsion tubes, magnets, etc. to convey the fluid reaction through the pressure wall to a responding element or indicator, the indicator can take any of forms illustrated or combinations thereof, as well as others which are used on similar applications in other related arts. Thus the broad aspect of the invention, resides in the sensing of the response of the liquid phase as it accumulates within a rotating pressure vessel, and the translation of this into a visible signal either immediately outside the roll or at a remote point thereto.

In view of our invention and disclosure, variations and modifications to meet individual whim or particular need will doubtless become evident to others skilled in the art, to obtain all or part of the benefits of our invention without copying the structure shown, and we therefore claim all such insofar as they fall within the reasonable spirit and scope of our invention.

Having thus described our invention what we claim as new and desire to secure by Letters Patent is:

1. A rotatable drum having a hollow interior which may contain liquid, means for rotating the drum at a rate at which the liquid is distributed by centrifugal force over the radially outer portion of the drum interior, and a liquid detector for the interior of the drum comprising a sensing element located inside the drum in the radially outer portion of the drum interior, actuated by the presence of a body of liquid within the drum, mounted on the drum and rotating with it, motion transmitting means for transmitting such activation to a point outside the drum, and indicator means outside the drum responsive to said transmission means, thereby indicating the presence or lack of a body of liquid within the drum.

2. A rotatable drum having a hollow interior which may contain liquid, means for rotating the drum at a rate at which the liquid is distributed by centrifugal force over the radially outer portion of the drum interior, and a liquid condensate detector for the inside of the drum comprising a sensing element located inside the drum, in the radially outer portion of the drum interior, said sensing element being mounted on the drum, rotating with the drum and physically displaced by a body of liquid within the drum, means for transmitting the displacement of motion of said sensing element to a location outside the drum, and indicator means outside the drum responsive to the transmission means, said indicator means upon activation thereby showing the presence of liquid within the drum.

3. A liquid condensate detector according to claim 2, wherein said sensing element is a float member responsive to the level of liquid within the drum.

4. A detector for indicating the presence of liquid within a rotating drum, comprising an elastically deflectable outer tube secured to and extending onto the body of the drum, a sensing element adjacent the inner surface of the drum affixed to the inner end of the outer tube, a core wire having a preformed curvature thereto freely disposed within the interior of said tube, torsional responsive indicating means integrally connected to the core wire outside the drum, said means pivoting with respect to the axis of the tube upon deflection of the outer tube by movement of the sensing element in response to the presence of liquid within the revolving drum.

5. A detector according to claim 4, wherein said sensing element is a displacement block responsive to the level of liquid in the drum.

6. A detector according to claim 4, wherein said indicating means comprises an electrical switch activated by angular movement of the core wire.

7. A rotatable drum having a hollow inside which may contain liquid, means for rotating the drum at a rate at which the liquid is distributed by centrifugal force over the radially outer portion of the drum interior, and a liquid detector for the inside of the drum comprising a float member positioned adjacent the radially outer portion of the inside of the drum, mounted on the drum and rotating with the drum, mechanical linkage pivotally connected to the float member within the drum and extending through the drum to a location outside the drum, and an indicator located on the outside of the drum, said indicator being activated by the linkage upon movement of the float in response to the presence of liquid inside the drum.

References Cited

UNITED STATES PATENTS

| | | | |
|---|---|---|---|
| 2,370,285 | 2/1945 | Beede et al. | 68—144 |
| 2,832,865 | 4/1958 | Stiner et al. | 340—244 X |
| 3,067,623 | 12/1962 | Kinderman | 73—321 X |
| 3,125,422 | 3/1964 | Thunander. | |

LOUIS R. PRINCE, *Primary Examiner.*

D. M. YASICH, *Assistant Examiner.*